(12) United States Patent
Chudgar et al.

(10) Patent No.: US 9,158,713 B1
(45) Date of Patent: Oct. 13, 2015

(54) PACKET PROCESSING WITH DYNAMIC LOAD BALANCING

(75) Inventors: Keyur Chudgar, Santa Clara, CA (US); Vinay Ravuri, Cupertino, CA (US); Loc Nhin Ho, San Jose, CA (US)

(73) Assignee: Applied Micro Circuits Corporation, Santa Clara, CA (US)

( * ) Notice: Subject to any disclaimer, the term of this patent is extended or adjusted under 35 U.S.C. 154(b) by 885 days.

(21) Appl. No.: 12/772,832

(22) Filed: May 3, 2010

Related U.S. Application Data (63) Continuation-in-part of application No. 12/756,128, filed on Apr. 7, 2010.

(51) Int. Cl.
  *G06F 9/46* (2006.01)
  *G06F 13/00* (2006.01)
  *G06F 9/50* (2006.01)
  *G06F 13/28* (2006.01)

(52) U.S. Cl.
  CPC .............. *G06F 13/00* (2013.01); *G06F 9/5083* (2013.01); *G06F 13/28* (2013.01); *G06F 2213/0038* (2013.01)

(58) Field of Classification Search
  CPC .......... G06F 9/5083; G06F 2213/0038; G06F 13/00; G06F 9/4881; G06F 13/28
  USPC .................................. 718/100, 105
  See application file for complete search history.

(56) References Cited

U.S. PATENT DOCUMENTS

| | | | | |
|---|---|---|---|---|
| 5,283,897 A * | 2/1994 | Georgiadis et al. | ........... | 718/105 |
| 5,655,120 A * | 8/1997 | Witte et al. | ................... | 718/105 |
| 5,860,137 A * | 1/1999 | Raz et al. | ...................... | 711/202 |
| 6,981,074 B2 * | 12/2005 | Oner et al. | ...................... | 710/32 |
| 6,993,762 B1 * | 1/2006 | Pierre | ............................ | 718/102 |
| 7,203,943 B2 * | 4/2007 | Shaffer | ........................ | 718/104 |
| 7,694,009 B2 * | 4/2010 | Shah et al. | .................... | 709/235 |
| 7,975,269 B2 * | 7/2011 | Bates et al. | ................... | 718/100 |
| 2001/0034752 A1 * | 10/2001 | Kremien | ...................... | 709/105 |
| 2002/0144027 A1 * | 10/2002 | Schmisseur | ...................... | 710/22 |
| 2003/0007636 A1 * | 1/2003 | Alves et al. | ..................... | 380/37 |
| 2003/0233497 A1 * | 12/2003 | Shih | ................................ | 710/22 |
| 2005/0021874 A1 * | 1/2005 | Georgiou et al. | ............. | 709/250 |
| 2005/0080952 A1 * | 4/2005 | Oner et al. | ...................... | 710/52 |

(Continued)

OTHER PUBLICATIONS

Sharma et al. Performance analysis of load balancing algorithms, World Academy of Science, Engineering and Technology, 38 (2008), pp. 269-272.*

*Primary Examiner* — Emerson Puente
*Assistant Examiner* — Willy W Huaracha
(74) *Attorney, Agent, or Firm* — Amin, Turocy & Watson, LLP (57) ABSTRACT

A system and method are provided for evenly distributing central processing unit (CPU) packet processing workloads. The method accepts packets for processing at a port hardware module port interface. The port hardware module supplies the packets to a direct memory access (DMA) engine for storage in system memory. The port hardware module also supplies descriptors to a mailbox. Each descriptor identifies a corresponding packet. The mailbox has a plurality of slots, and loads the descriptors into empty slots. There is a plurality of CPUs, and each CPU fetches descriptors from assigned slots in the mailbox. Then, each CPU processes packets in the system memory in the order in which the associated descriptors are fetched. A load balancing module estimates each CPU workload and reassigns mailbox slots to CPUs in response to unequal CPU workloads.

18 Claims, 6 Drawing Sheets

(56) References Cited

U.S. PATENT DOCUMENTS

| | | | |
|---|---|---|---|
| 2005/0081203 A1* | 4/2005 | Aguilar et al. | 718/100 |
| 2005/0188373 A1* | 8/2005 | Inoue et al. | 718/100 |
| 2006/0277545 A1* | 12/2006 | Togawa et al. | 718/100 |
| 2008/0301695 A1* | 12/2008 | Aguilar et al. | 718/105 |
| 2009/0100200 A1* | 4/2009 | Bouvier | 710/26 |
| 2010/0031267 A1* | 2/2010 | Maessen et al. | 718/105 |
| 2015/0040138 A1* | 2/2015 | Neubauer et al. | 718/105 |

* cited by examiner

| CPU 0 (120a) | Bit map |
|---|---|
| Mailbox 1 | Mail slots 0 and 2 |
| Mailbox 2 | Mail slots 0 and 2 |
| Mailbox 3 | Mail slots 0 and 2 |
| Mailbox 4 | Mail slots 0 and 2 |
| CPU 1 (120n) | Bit map |
| Mailbox 1 | Mail slots 1 and 3 |
| Mailbox 2 | Mail slots 1 and 3 |
| Mailbox 3 | Mail slots 1 and 3 |
| Mailbox 4 | Mail slots 1 and 3 |

FIG. 5

| Mailbox 1 | | | | Mailbox 2 | | | | Mailbox 3 | | | | Mailbox 4 | | | |
|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 |

| Mailbox 1 | | | | Mailbox 2 | | | | Mailbox 3 | | | | Mailbox 4 | | | |
|---|---|---|---|---|---|---|---|---|---|---|---|---|---|---|---|
| 0 | 1 | 0 | 1 | 0 | 1 | 0 | 1 | 0 | 1 | 0 | 1 | 0 | 1 | 0 | 1 |

FIG. 6A

| Mailbox 1 | | | | Mailbox 2 | | | | Mailbox 3 | | | | Mailbox 4 | | | |
|---|---|---|---|---|---|---|---|---|---|---|---|---|---|---|---|
| 1 | 1 | 1 | 0 | 1 | 1 | 1 | 0 | 1 | 1 | 1 | 0 | 1 | 1 | 1 | 0 |

FIG. 6B

| Mailbox 1 | | | | Mailbox 2 | | | | Mailbox 3 | | | | Mailbox 4 | | | |
|---|---|---|---|---|---|---|---|---|---|---|---|---|---|---|---|
| 0 | 0 | 0 | 1 | 0 | 0 | 0 | 1 | 0 | 0 | 0 | 1 | 0 | 0 | 0 | 1 |

PACKET PROCESSING WITH DYNAMIC LOAD BALANCING

RELATED APPLICATIONS

This application is a Continuation-in-Part of a patent application entitled, MULTI-PROCESSOR SYSTEM-ON-CHIP WITH DYNAMIC PACKET PROCESSING LOAD CONTROL, invented by Keyur Chudgar et al, Ser. No. 12/756,128, filed Apr. 7, 2010, which is incorporated herein by reference.

BACKGROUND OF THE INVENTION

1. Field of the Invention

This invention generally relates to computer processing and, more particularly, to a system and method for equally distributing a packet processing load among parallel processors.

2. Description of the Related Art

As noted in Wikipedia, direct memory access (DMA) is a feature of modern computers and microprocessors that allows certain hardware subsystems within the computer to access system memory for reading and/or writing independently of the central processing unit (CPU). Many hardware systems use DMAs, including disk drive controllers, graphics cards, network cards and sound cards. DMA is also used for intra-chip data transfer in multi-core processors, especially in multiprocessor system-on-chips (SoCs), where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly a processing element inside a multi-core processor can transfer data to and from its local memory without occupying its processor time, thus permitting computation and data transfer concurrency.

Without DMA, using programmed input/output (PIO) mode for communication with peripheral devices, or load/store instructions in the case of multicore chips, the CPU is typically fully occupied for the entire duration of the read or write operation, and is thus unavailable to perform other work. With DMA, the CPU can initiate the transfer, do other operations while the transfer is in progress, and receive an interrupt from the DMA controller once the operation has been done. This is especially useful in real-time computing applications where not stalling behind concurrent operations is critical. Another and related application area is various forms of stream processing where it is essential to have data processing and transfer in parallel, in order to achieve sufficient throughput.

A DMA transfer copies a block of memory from one device to another. While the CPU initiates the transfer by issuing a DMA command, it does not execute it. For so-called "third party" DMA, as is normally used with the ISA bus, the transfer is performed by a DMA controller which is typically part of the motherboard chipset. More advanced bus designs such as PCI typically use bus mastering DMA, where the device takes control of the bus and performs the transfer itself. In an embedded processor or multiprocessor system-on-chip, it is a DMA engine connected to the on-chip bus that actually administers the transfer of the data, in coordination with the flow control mechanisms of the on-chip bus.

A typical usage of DMA is copying a block of memory from system RAM to or from a buffer on the device. Such an operation usually does not stall the processor, which as a result can be scheduled to perform other tasks unless those tasks include a read from or write to memory. DMA is essential to high performance embedded systems. It is also essential in providing so-called zero-copy implementations of peripheral device drivers as well as functionalities such as network packet routing, audio playback, and streaming video. Multicore embedded processors (in the form of multiprocessor system-on-chip) often use one or more DMA engines in combination with scratchpad memories for both increased efficiency and lower power consumption. In computer clusters for high-performance computing, DMA among multiple computing nodes is often used under the name of remote DMA.

A general purpose programmable DMA controller is a software-managed programmable peripheral block charged with moving or copying data from one memory address to another memory address. The DMA controller provides a more efficient mechanism to perform large data block transfers, as compared to a conventional general purpose microprocessor. The employment of DMA controllers frees up the processor and software to perform other operations in parallel. Instruction sequences for the DMA, often referred to as control descriptors (CDs or descriptors), are set up by software and usually include a source address, destination address, and other relevant transaction information. A DMA controller may perform other functions such as data manipulations or calculations.

Control descriptors are often assembled in groups called descriptor sequences or rings. Typically, the software control of a DMA controller is enabled through a device specific driver. The device driver is responsible for low level handshaking between upper layer software and the hardware. This device driver manages the descriptor rings, communicates with the DMA controller when work is pending, and communicates with upper layer software when work is complete.

It is possible that a DMA controller may be shared by many concurrent software threads running on one or more processors. Conventionally, a DMA controller maintains the logical concept of "channels", whereby a channel provides the interface between a single software thread and the DMA controller. In other words, each software thread is associated with a channel. More concurrent driver threads require more DMA controller channels.

It has often been practice to provide multiple channels to address two concerns: thread sharing and quality of service. Oftentimes, multiple concurrent threads are used in systems for the parallel processing different aspects of data flow. Where multiple independent threads are deployed, sharing a common DMA controller can be cumbersome to manage. The software device driver in this case must not only provide the DMA controller with communications, but must also manage an arbitration scheme with upper layer software threads to determine which work gets done next. If this work is being carried out by multiple microprocessors, the overhead of coordination between threads is very complicated. The overhead coordination requires a certain level of software handshaking to determine which thread gets access to the controller at any particular time.

From a quality of service perspective, it is common to have higher and lower priority activities. For example, a software thread may queue a low priority transfer for a DMA controller. At some later time a different thread may be queued, which needs to run a higher priority task on the DMA controller. The ability to pre-empt low priority activities with higher priority tasks is a highly desired feature. Without such capability, a high priority operation must wait until a low priority operation is completed.

A multi-channel DMA controller addresses these issues where different software threads can be bound to specific channels and the underlying DMA controller hardware sorts out the access profile to memory based upon channel priorities. A disadvantage of the channel approach is that there are a limited number of hardware channels. If more logical threads exist than physical channels, then a software mechanism must once again be deployed to take care of the resource contention.

DMA controllers must also maintain a certain level of atomicity with respect to the execution of operations. This means that operational sequences must complete in the order programmed by software. This is typically accomplished using a run-to-completion model whereby a DMA channel completes all operations of a first CD, before moving onto the next CD. However, a brute-force run-to-completion methodology may prevent the data moving engine from performing un-related operations (operations from different CD lists) in parallel, even if the engine is capable.

The communication between software and the DMA controller hardware is typically handled through a programmed input/output (IO) interface. That is, the software device driver programs control registers within the DMA channel, which causes the DMA to carry out the desired action. When the DMA controller is finished it communicates back to software, either through use of a hardware interrupt request, or through setting of a status bit that is polled by software. The software must wait until the current instruction sequence is complete before programming the next sequence. During the software/hardware handshake period the DMA channel is idle waiting for the next CD, thus resulting in dead time that could have been used for real work. To overcome this dead time, DMA controllers may deploy the concept of control descriptor sequences (CDS) and descriptor rings.

The descriptor ring provides a form of FIFO where the software adds new items in memory for the DMA channel at the tail of the ring, while the DMA controller processes CDs from the head of the ring. In this way, the software manages the tail pointers and the hardware (HW) manages the head pointer. Such schemes have the disadvantage of requiring software overhead to keep track of pointers.

A direct CD embodies the command descriptor completely within the command message. A pointer CD contains a pointer to a memory location where a single command descriptor, or a linked list of command descriptors, is located. In this case, a single command message may actually represent a number of chained command descriptors.

In many SoC multicore (multi-processor) systems, an interrupt is assigned to single CPU core from an external device. For example, in a packet processing application an Ethernet device receives the packet and triggers an interrupt to a CPU core. The CPU core acknowledges interrupt, retrieves packet context, and processes packet. The CPU core has to wait for this packet to be processed before it processes the next packet coming in via the same Ethernet port, which causes delay to process second packet.

In a multicore system with multiple Ethernet ports, each port can be assigned to a different CPU core. This is called interrupt affinity. In this case, two packets can be processed in parallel by two different CPU cores if the packets come in on different ports. However, this interrupt affinity introduces inefficiency in using the CPU cores at their full capacity when one port is receiving data, and other port is receiving a lesser amount of data, or no data at all. In this case, one core(s) can be sitting ideal while another core is processing packets, delaying the packet processing of other packets on the same interface.

It is possible to parallel process interrupts in multicore system. The pipeline packet process divides complete packet processing in multiple stages. For example, stage 1 is ingress processing, stage 2 is forwarding, and stage 3 is egress processing. In this case it is possible to perform stage 1 and stage 2 processing in CPU 0, and stage 3 processing in CPU 1. The problem with this method is that each CPU is given a fixed allocation of tasks to be performed. If the processing workload is uneven, there is no means to redistribute the workload dynamically.

With transmission control protocol (TCP) flow pinning, the packets are divided into groups that are processed by particular CPUs based upon packet type. For example, even if the packets are coming in from same Ethernet port, they may be delivered to different CPUs based on some pre-classification. That is, a particular TCP flow is always be given to an associated CPU. However, if the packets coming in one flow are more than the packets coming in other flow, the CPUs are not utilized efficiently. Further, if packets keep coming from only one flow, then only one CPU is used. This method also limits the load balancing to certain packet types.

Another solution is to trigger the interrupt to all the cores when a packet is received on one port. All the cores acknowledge the interrupt, and they all compete to obtain a global lock. Whoever gets the lock first, processes the packet. If a CPU is not able to get the lock, it sends an end of interrupt indication. The drawback to this method is that the cores waste time in competing for the global lock. Since this competition occurs for every interrupt, a significant amount of processor time is wasted. Also, there is no software control or flexibility in the system, and no predictability as to which core will process a packet. Further, no weight can be given to any CPU. For example, it is impossible to configure a system to grant 6 interrupts to CPU 0, for every 4 interrupts to CPU 1, as the competition for global lock is completely random.

It would be advantageous if the above-mentioned problems could be solved by balancing the load between multiple cores that are parallel processing packets.

SUMMARY OF THE INVENTION

Disclosed herein are a system and method for the processing of tasks, decided based on interrupts and distributed across multiple processors, so that multiple central processing units (CPUs) can be efficiently used for single interrupt processing. The system and method support load balancing using hardware, which reduces overall system complexity, power usage, die size, and cost. The system is flexible in that it permits load balancing, dynamically based on current CPU usage. The software supporting the system is embedded at a very low level, which reduces complications with applications and the operating system (OS).

Accordingly, a method is provided for evenly distributing central processing unit (CPU) packet processing workloads. The method accepts packets for processing at a port hardware module port interface. The port hardware module supplies the packets to a direct memory access (DMA) engine for storage in system memory. The port hardware module also supplies descriptors to a mailbox. Each descriptor identifies a corresponding packet. The mailbox has a plurality of slots, and loads the descriptors into empty slots. There is a plurality of CPUs, and each CPU fetches descriptors from assigned slots in the mailbox. Then, each CPU processes packets in the system memory in the order in which the associated descriptors are fetched.

In one aspect, there is a plurality of port hardware modules accepting packets, and each port hardware module supplies descriptors to a corresponding mailbox. Each CPU accepts a numbered interrupt vector, where each vector is associated with a corresponding mailbox, and fetches descriptors from assigned slots in the mailbox associated with the interrupt vector number. A load balancing module, enabled as a sequence of software instructions stored in a computer-readable memory and executed by a CPU, estimates each CPU workload and reassigns mailbox slots to CPUs in response to unequal CPU workloads.

The load balancing module estimates each CPU workload by interrogating the CPUs to determine the number of queued packets in mailbox slots that are yet to be processed by each CPU. In another aspect, an operating system (OS) maintains a packet queue table in memory for each CPU, for packets already delivered to the OS, but not yet processed. The load balancing module interrogates the OS to determine the status of each packet queue table as part of estimating each CPU workload. In another aspect, the load balancing module estimates the CPU workloads in response to packet types yet to be processed, and other OS directed tasks (besides packet processing) that are backlogged, but in a runnable state.

Additional details of the above-described method and SoC system for evenly distributing CPU packet processing workloads are provided below.

DETAILED DESCRIPTION

Figure 1:
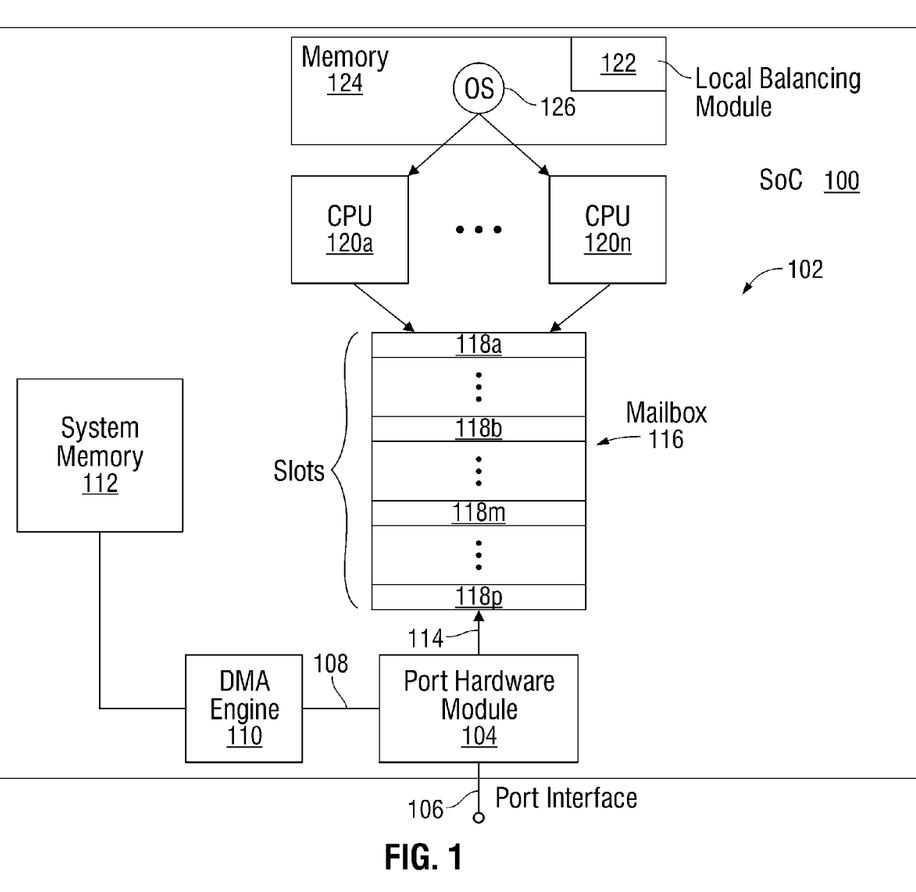
FIG. 1 is a schematic block diagram of a system-on-chip (SoC) with a plurality of central processing units (CPUs), and a system for evenly distributing CPU packet processing workloads.

FIG. 1 is a schematic block diagram of a system-on-chip (SoC) 100 with a plurality of central processing units (CPUs), and a system for evenly distributing CPU packet processing workloads. The system 102 comprises a port hardware module 104 having a port interface on line 106 to accept packets for processing, and a direct memory access (DMA) interface on line 108 supplying the packets to a DMA engine 110 for storage in system memory 112. The port hardware module 104 also has a descriptor interface on line 114 to supply a descriptor identifying each corresponding packet. A mailbox 116 has a plurality of slots 118 and an input connected to the port hardware module on line 114 to accept descriptors and load the descriptors into empty slots 118.

The system 102 also includes a plurality of CPUs 120. Shown are CPUs 120a through 120n, where n is a variable not limited to any particular value. Each CPU 120 fetches descriptors from assigned slots 118 in the mailbox 116, and processes packets in the system memory 112 in the order in which the associated descriptors are fetched. In this example, CPU 120a is assigned slots 118a through 118b, and CPU 120n is assigned slots 118m through 118p. Note: each CPU is not limited to a particular number of slots, as the letters "b" and "p" are variables not limited to any particular value.

A load balancing module 122, also known as a load monitor, has an interface connected to each CPU 120 to estimate CPU workload, and an output connected to each CPU, to reassign mailbox slots to CPUs in response to unequal CPU workloads. For example, the load balancing module 122 may establish a minimum workload threshold for each CPU, and it reassigns additional mailbox slots to a CPU in response to the estimated overall workload for that CPU dropping below the threshold. In one aspect, the reassigned mailbox slots are taken from CPUs having the highest workloads.

As shown, the load balancing module is an application enabled as a sequence of software instructions stored in a computer-readable memory 124 and executed by a CPU. Although it would be possible to enable the load balancing module to interface with the CPUs directly, it is typically more practical to use an operating system (OS) as an interface between the load balancing module 122 and the CPUs 120, as there may be other software applications that request CPU services. The OS is also a sequence of processor executable software instructions stored in memory 124.

In one aspect, the CPUs 120 fetch descriptors from assigned slots in a predetermined order of rotation. For example, the order of rotation can be from the slot with the lowest order subscript to the highest order subscript (e.g., 118a to 118b), and then returning to the lowest order (118a). In another aspect, the mailbox 116 loads descriptors into empty slots 118 in a predetermined order of rotation, independent of CPU assignment. Again, the order of rotation can be from the slot with the lowest order subscript to the highest order subscript (e.g., 118a to 118q), and then returning to the lowest order (118a), regardless of which slots are assigned to which CPU. Other fetching and loading algorithms are also possible.

Figure 2:
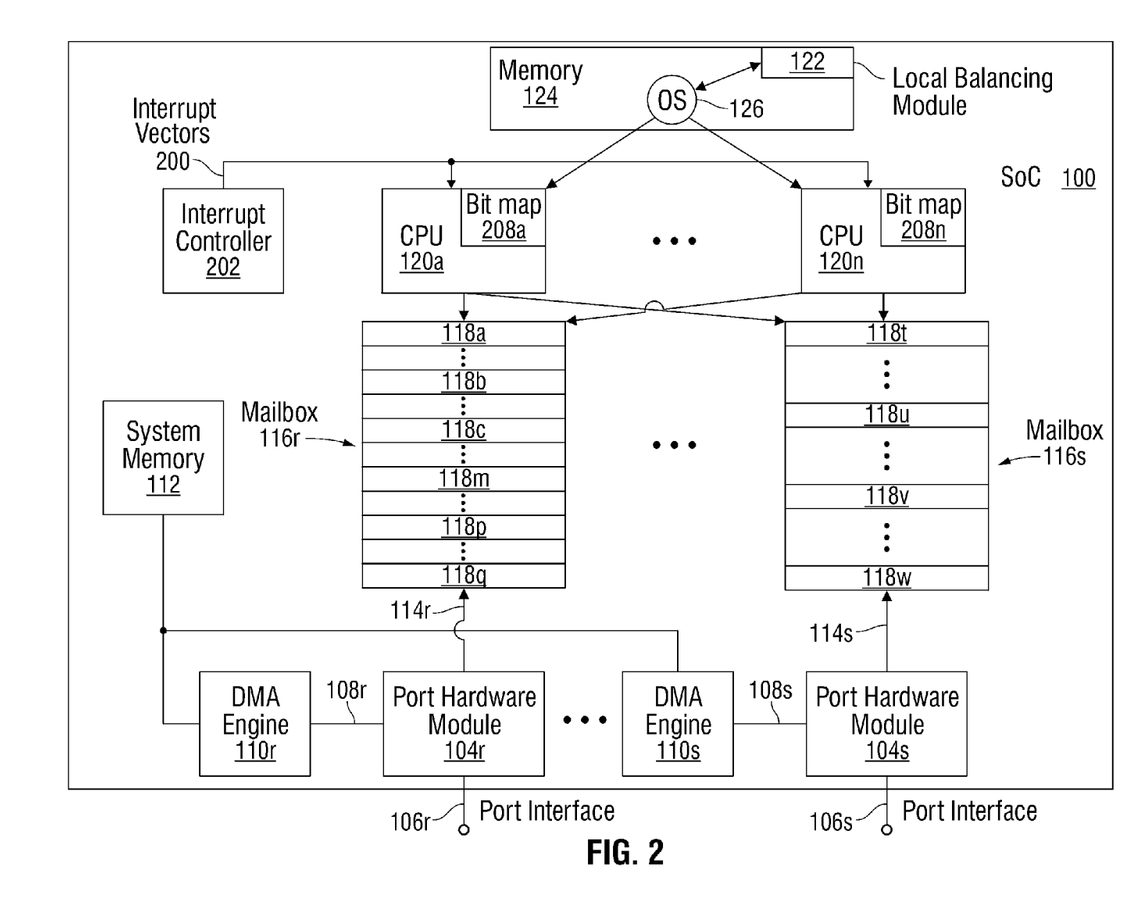
FIG. 2 is a schematic block diagram depicting a variation of the system of FIG. 1.

FIG. 2 is a schematic block diagram depicting a variation of the system of FIG. 1. In this aspect, the system further comprises a plurality of port hardware modules. Shown are port hardware modules 104r through 104s, where s is a variable not limited to any particular value. Also shown is a plurality of mailboxes 116r through 116s. Each mailbox 116 is connected to an associated port hardware module 104. Each CPU 120 has an interrupt interface on line 200 to accept a numbered interrupt vector from an interrupt controller 202, which is typically a hardware device. Each CPU fetches descriptors from assigned slots 118 in a mailbox associated with the interrupt vector number. Likewise, a DMA engine 110 is assigned to an associated port hardware module 104.

For example, the interrupt controller 202 initially supplies a first interrupt vector and subsequently supplies a second interrupt vector. In this example, CPU 120a fetches descriptors in a predetermined order of rotation from a first group of slots 118a-118b in mailbox 116r, in response to the first interrupt vector. Concurrently, CPU 120n fetches descriptors in a predetermined order of rotation from slots 118m-118p in mailbox 116r, in response to the first interrupt vector. In response to the second interrupt vector, CPU 120a fetches descriptors in a predetermined order of rotation from slots 118t-118u in mailbox 116s, and CPU 120n fetches descriptors in a predetermined order of rotation from slots 118v-118w in mailbox 116s. Although only two interrupt vectors are used in this example, the system may use a larger number of interrupts (and associated mailboxes) in actual practice.

Figure 3:
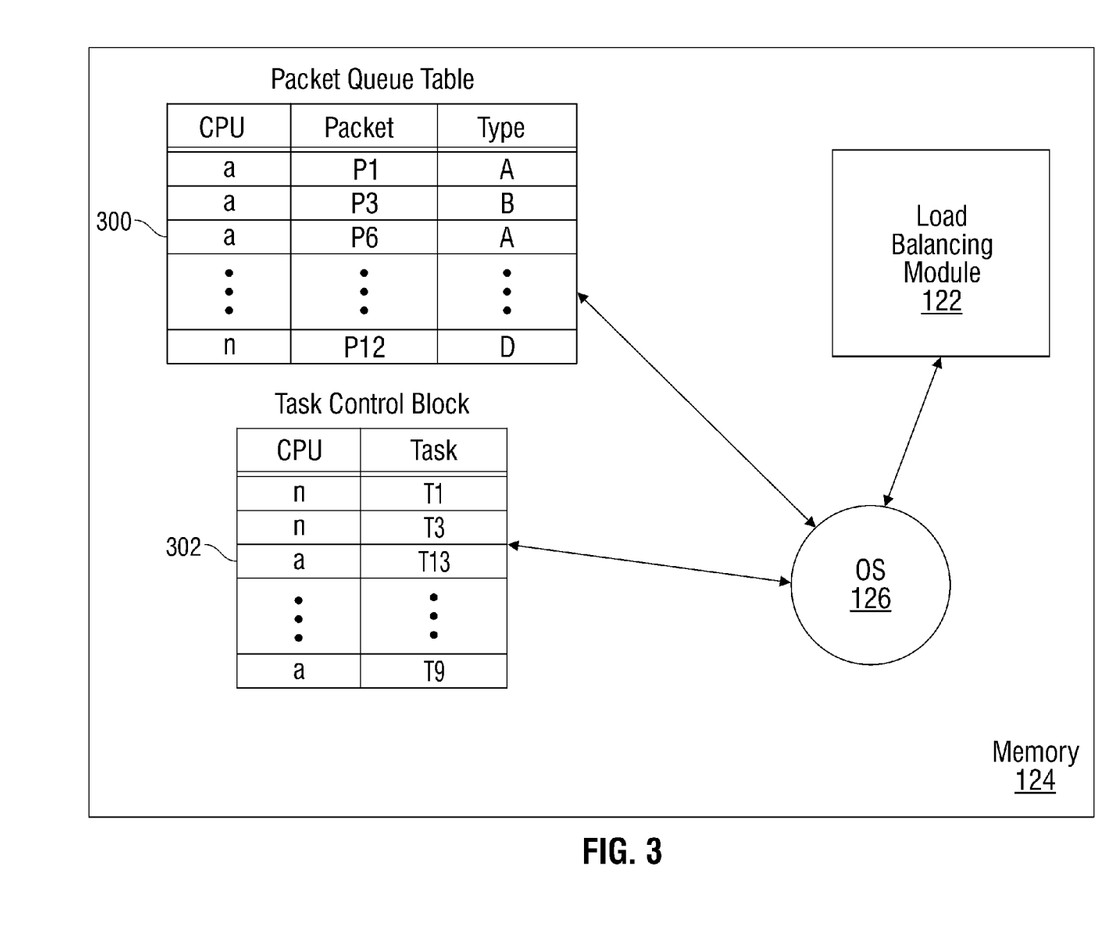
FIG. 3 is a diagram depicting the memory of FIG. 2 in greater detail.

FIG. 3 is a diagram depicting the memory of FIG. 2 in greater detail. Contrasting FIGS. 2 and 3, in one aspect the load balancing module 122 estimates CPU workloads by interrogating the CPUs (through the OS), to determine the number of queued packets in mailbox slots, yet to be processed by each CPU. In another aspect, the OS 126 maintains a packet queue table 200 in memory 124 for each CPU, with packets already delivered to the OS, but not yet processed. The load balancing module 122 interrogates the OS to determine the status of each packet queue table and estimates the workload of each CPU in response to the packet queue table status. In a related aspect, the OS 126 cross-references packets to packet types in the packet queue table 300. The load balancing module interrogates the OS to determine the type of packets yet to be processed, and estimates the CPU workloads in response to packet type.

In many systems the CPUs 120 perform additional, OS directed, tasks besides packet processing. In this case, the OS 126 may maintain a task control block 302 (TCB) in memory 124 for each CPU 120, with backlogged tasks in a runnable state. Then, the load balancing module 122 interrogates the OS 126 to determine TCB status, and estimates the CPU workloads in response to TBS status.

In one aspect, the load balancing module 122 performs a closed-loop analysis for a subsystem including the CPUs, the port hardware modules, and the mailboxes, to evenly distribute the CPU workloads between the plurality of CPUs. In another aspect, the subsystem additional includes the OS-maintained packet queue table and task control block.

In another aspect, each CPU 120 includes a mailbox bitmap 208. The bitmap can be enabled as a small memory in each CPU core. The load balancing module 122 assigns mailbox slots to a CPU by enabling bits in the CPU bitmap 208.

As another example, the load balancing module 122 initially assigns slots 118*a*-118*b* in mailbox 116*r* to CPU 120*a*, and slots 118*m*-118*p* in mailbox 116*r* to CPU 120*n*. Subsequently, the load balancing module reassigns slots 118*a*-118*c* in mailbox 116*r* to CPU 120*a* and slots 118*p*-118*q* in mailbox 116*r* to CPU 120*n*. The slots in mailbox 116*s*, and any other mailbox (not shown), can be reassigned in a similar manner.

Functional Description

As shown in FIGS. 1 and 2, the system permits a SoC with multiple CPUs to process a single interrupt source in parallel. That is, multiple CPUs can work on tasks which are based on the same interrupt. Conventionally, only one CPU acts on the given interrupt. The mailboxes are enabled in hardware. Each mailbox is associated with a different interrupt. Each mailbox has multiple mail slots. The number of mail slots can, at a minimum, be equal to the number of CPUs in the system that participate in the parallel processing. At least one mail box is assigned to each CPU.

A system-wide bit map is created and stored in each participating CPU. The bit map contains bits for the combined total number of CPU mailboxes slots. As an example, if there are sixteen mailboxes, each having four mail slots, then each CPU has a bit map of 64 bits. Bits in the bit map are enabled to permit a CPU to process an interrupt. If there are only two CPUs in the system, they have totally opposite bit map sets.

Figure 4:
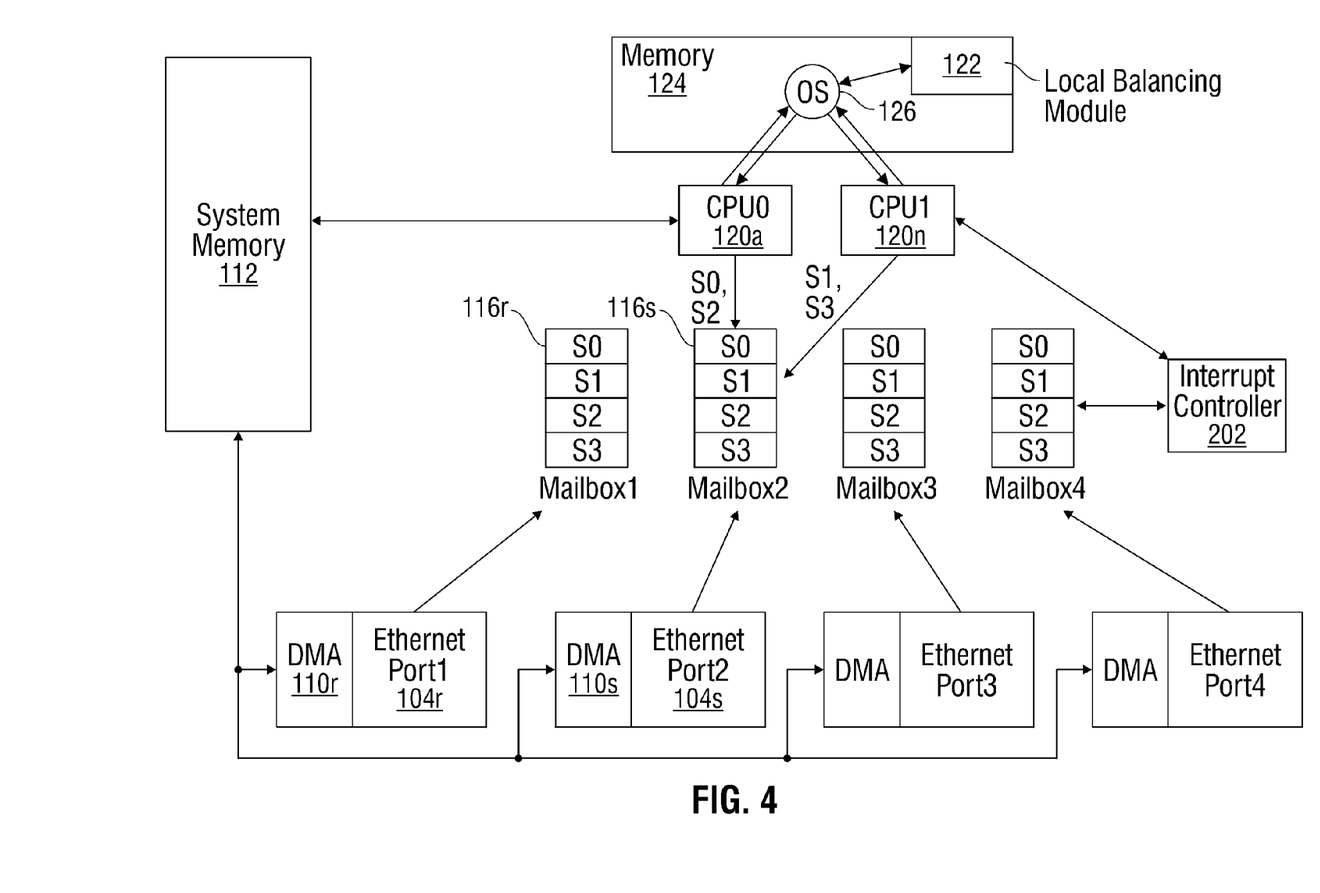
FIG. 4 is a schematic block diagram depicting a system with two CPUs and four mailboxes.

FIG. 4 is a schematic block diagram depicting a system with two CPUs and four mailboxes. When an interrupt occurs, hardware (e.g., the interrupt controller) provides the interrupt message information to the CPUs and the load balancing module assigns mailbox slots. For example, packets may be processed from a single Ethernet port by two CPUs in parallel. The interrupt to the CPUs is triggered when Ethernet hardware (e.g., port hardware module) provides the context information, which can also be referred to as a descriptor, for a current packet in the mailbox. For example, if there are four mail slots, the Ethernet hardware may write a descriptor to mail slot 1 for packet 1, a descriptor to mail slot 2 for packet 2, a descriptor to mail slot 3 for packet 3, and a descriptor to mail slot 4 for packet 4. If CPU reads mail slot 1, and it is available for a new descriptor, mail slot 1 can be used for the packet 5 descriptor. Otherwise, the Ethernet hardware waits for the next mail slot to be available.

Figure 5:
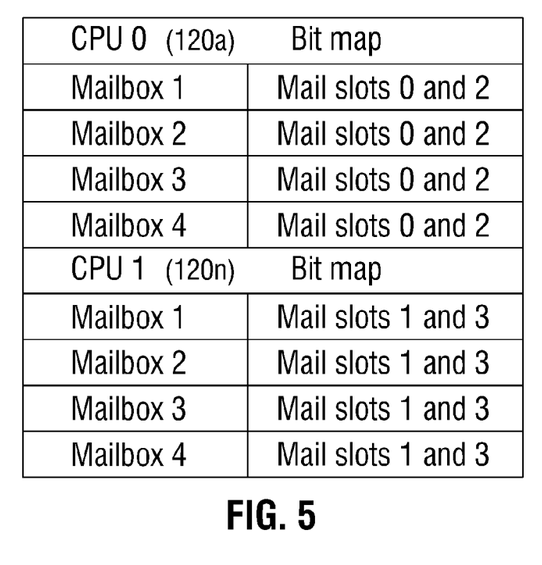
FIG. 5 is a diagram depicting CPU bit maps, cross-referencing mailboxes to mailbox slots.

FIG. 5 is a diagram depicting CPU bit maps, cross-referencing mailboxes to mailbox slots. In the bitmap configuration for CPU 0 (CPU 120*a*), bits are enabled for mail slots 0 and 2 for mailbox 116*r* (mailbox 1). For CPU 1 (CPU 120*n*), bits for mail slots 1 and 3 are enabled for mailbox 116*s*. When the interrupt triggers, the interrupt is received by both CPUs. Depending on if their appropriate mail slots have packets to process, they read the descriptor and process the packet. As a result, when packet P1 is being processed by CPU 0, packet P2 is being processed by CPU1 in parallel.

The load on any CPUs can be dynamically manipulated by changing the bit map configurations. For example, a default configuration may give the same weight to two CPUs, assuming they both have identical loads. At runtime, if CPU 0 becomes much more loaded than CPU 1, and CPU 1 is able to process more packets, the bit maps can be changed to give only one mail slot to CPU 0 and the remaining mail slots to CPU 1. In a four-slot mailbox, one packet is processed by CPU 0 and three packets are processed by CPU 1 for every four packets.

In addition, the granularity of load balancing process can be increased by increasing the number of mail slots. If there are only four slots and two CPUs, the minimum granularity is only 25%. If a minimum granularity of 10% is desired, the number of mailboxes can be increased to ten. In this case if CPU has only one slot, it will be processing only 10% of the overall load.

Figure 6A:
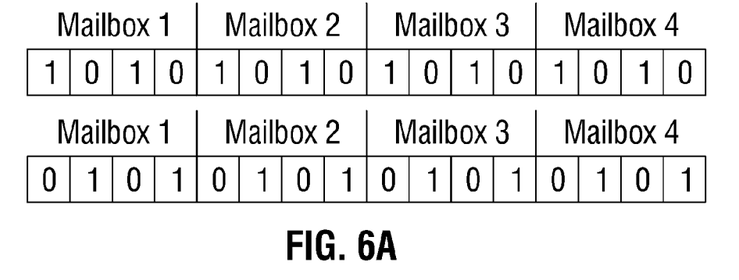
FIGS. 6A through 6C are a diagram depicting an example of CPU bitmap loading.
Figure 6B:
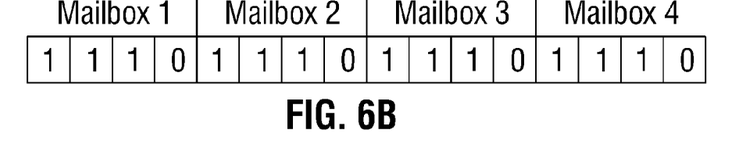
Figure 6C:
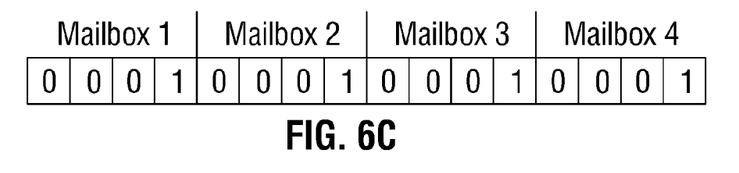

FIGS. 6A through 6C are a diagram depicting an example of CPU bitmap loading. Assuming two CPUs and four mailboxes, a 50% load on both CPUs can be achieved using either the top or bottom configuration shown in FIG. 6A. In FIG. 6B, a 75% load is assigned to CPU 1 and 25% load to CPU 0. In FIG. 6C, a 75% workload is assigned to CPU 0 and a 25% workload to CPU 1.

As noted above, there are a number of ways of monitoring the CPUs and the criteria to be used to determine the load on the CPUs. In multicore systems, there are data structures in the operating systems, which exist on a per CPU basis. The OS monitors these per CPU data structures to determine the current state of the CPUs. For example, there can be many processes backlogged on a CPU 0, and not much running on CPU1. This can be determined by a TCB (task control block) per CPU. This block has all the pending processes which are in runnable state.

Other method determines the type of packets that are queued up. For example, for simple IPv4 forwarding, the time to process the packet is relatively small. For a TCP termination packet or even higher layer packets, then the time to process the packets is much greater. The OS kernel also has the packet queue data structure which is per CPU. Knowing the kind of packets that are queued up for each CPU, the load can be balanced, not only by number of packets queued up, but also by the kinds of packets that are queued up. To prevent hysteresis a threshold can be defined. The load balance change only occurs if a load value crosses this threshold. The delay in making threshold triggered changes is a function of the closed loop bandwidth.

Figure 7:
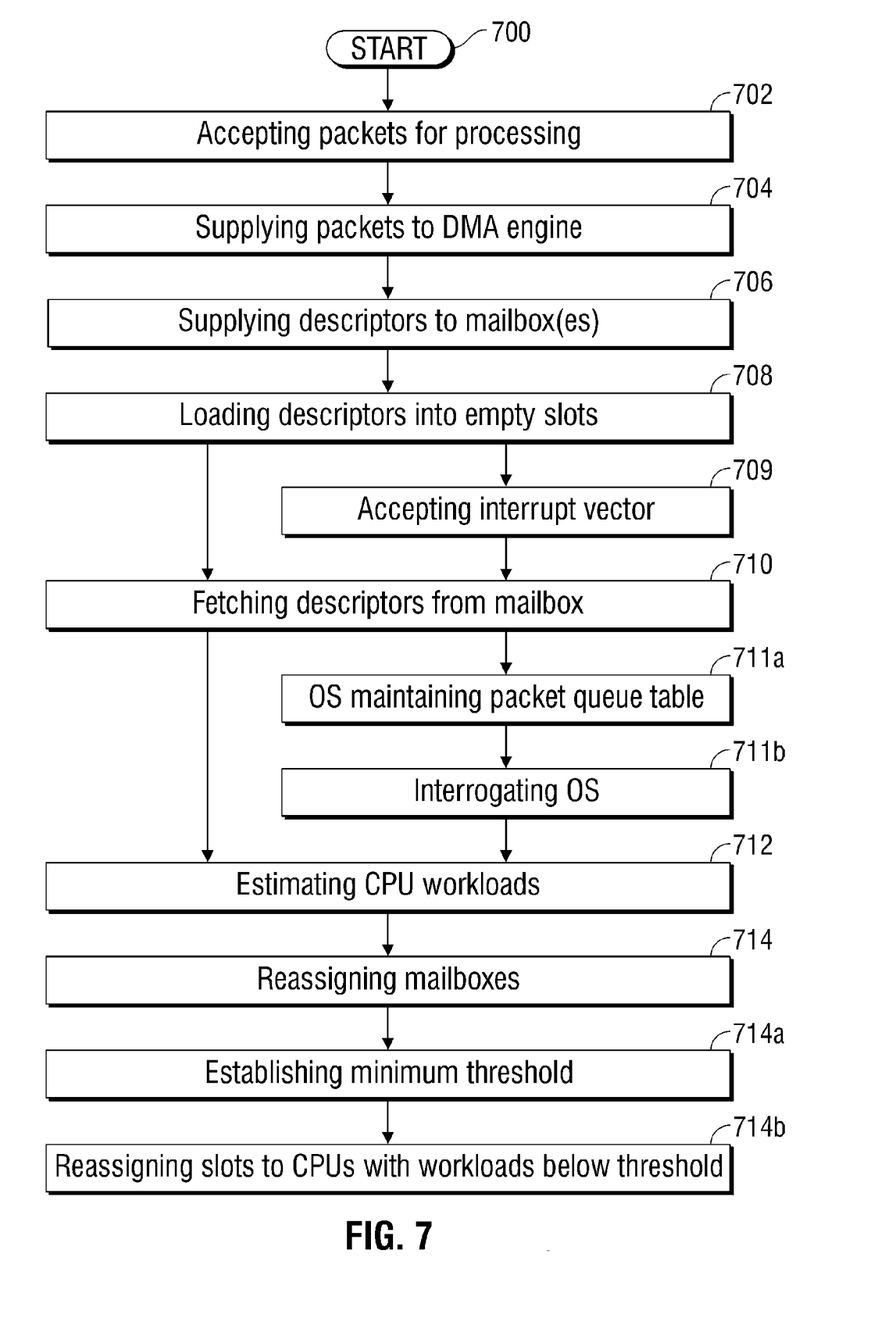
FIG. 7 is a flowchart illustrating a method for evenly distributing CPU packet processing workloads in a SoC including a plurality of CPUs.

FIG. 7 is a flowchart illustrating a method for evenly distributing CPU packet processing workloads in a SoC including a plurality of CPUs. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 700.

Step 702 accepts packets for processing at a port hardware module port interface. In Step 704 the port hardware module supplies the packets to a DMA engine for storage in system memory. In step 706 the port hardware module supplies descriptors to a mailbox, where each descriptor identifies a corresponding packet. In Step 708 the mailbox, which has a plurality of slots, loads the descriptors into empty slots. For example, descriptors may be loaded into empty slots in a predetermined order of rotation, independent of CPU assignment. In Step 710 each CPU from a plurality of CPUs, fetches descriptors from assigned slots in the mailbox. For example, the descriptors may be fetched in a predetermined order of rotation. In Step 712 each CPU processes packets in the system memory in the order in which the associated descriptors are fetched from the mailbox. In Step 714 a load balancing module, enabled as a sequence of software instructions stored in a computer-readable memory and executed by a CPU, estimates each CPU workload. In Step 716 the load balancing module reassigns mailbox slots to CPUs in response to unequal CPU workloads.

In one aspect, accepting the packets for processing in Step 702 includes a plurality of port hardware modules accepting packets, and supplying descriptors in Step 706 includes each port hardware module supplying descriptors to a corresponding mailbox (each mailbox is associated with a corresponding port hardware module). In Step 709 each CPU accepts a numbered interrupt vector, where each vector is associated with a corresponding mailbox, and fetching descriptors from assigned slots in the mailbox in Step 710 includes each CPU fetching descriptors from assigned slots in the mailbox associated with the interrupt vector number.

In one aspect, estimating each CPU workload in Step 712 includes the load balancing module interrogating the CPUs to determine the number of queued packets in mailbox slots, yet to be processed by each CPU. In another aspect, an OS in Step 711*a*, enabled as a sequence of software instructions stored in the computer-readable memory and executed by a CPU, maintains a packet queue table in memory for each CPU, for packets already delivered to the OS, but not yet processed. In Step 711*b* the load balancing module interrogates the OS to determine the status of each packet queue table. Then Step 712 estimates the workload of each CPU in response to the packet queue table status. In a related aspect the OS, in Step 711*a*, cross-references packets to packet types in the packet queue table, and in Step 711*b* the load balancing module interrogates the OS to determine the type of packets yet to be processed. Then, estimating each CPU workload in Step 712 includes estimating the CPU workloads in response to packet types yet to be processed.

In a different aspect, the CPUs perform additional, OS directed, tasks besides packet processing, and in Step 711*a* the OS maintains a task control block (TCB) in memory for each CPU, with backlogged tasks in a runnable state. The load balancing module interrogates the OS to determine TCB status in Step 711*b*, and in Step 712 the CPU workloads are estimated in response to TBS status.

In one aspect, the load balancing module reassigns mailbox slots to CPUs in Step 714 in response to performing a closed-loop analysis for a system including the CPUs, the port hardware modules, the OS, and the mailboxes, to evenly distribute the CPU workloads between the plurality of CPUs. Alternately, the tasks and unprocessed packets that are tracked by the OS are not part of the closed loop system. Performing the closed-loop analysis may include substeps. Step 714*a* establishes a minimum workload threshold for each CPU, and Step 714*b* reassigns additional mailbox slots to a CPU in response to the estimated overall workload for that CPU dropping below the threshold.

A system and method are provided for evenly distributing CPU packet processing workloads in a SoC using multiple processors. Examples of the invention have been described through the use of modules and process flows, but the invention is not limited to just these examples. Other variations and embodiments of the invention will occur to those skilled in the art.

We claim:

1. A data packet processing system, comprising:
a memory comprising stored data packets;
a mailbox comprising a plurality of slots, each slot loaded with a descriptor that identifies each data packet;
a plurality of processors, each processor configured to fetch descriptors from an assigned mailbox slot and process data packets identified by the fetched descriptors in an order in which the associated descriptors are fetched;
an operating system stored in the memory and executed by one or more of the plurality of processors, wherein the operating system is configured to maintain a packet queue table for each of the plurality of processors, and each packet queue table
identifies data packets that are waiting to be processed by one of the plurality of processors, and
cross-references the data packets to corresponding packet types; and
a load balancing module configured to
interrogate the operating system to determine, based on the packet queue table for each of the plurality of processors, a number of data packets waiting to be processed by each of the plurality of processors and respective packet types of the data packets,
determine each processor's workload based on the number of data packets waiting to be processed and the packet types of the data packets waiting to be processed, and
reassign slots to processors in response to unequal processor workloads.

2. The system of claim 1, further comprising:
a plurality of port hardware modules;
a plurality of mailboxes,
wherein each of the plurality of mailboxes is associated with one of the plurality of port hardware modules, and
wherein each of the plurality of processors has an interrupt interface to accept an interrupt vector number, and each of the plurality of processors is configured to fetch descriptors from an assigned mailbox slot in a mailbox associated with the interrupt vector number.

3. The system of claim 2, further comprising:
an interrupt controller configured to supply the interrupt vector number to each of the plurality of processors.

4. The system of claim 2, wherein the load balancing module is configured to estimate the processor workloads based on a determined number of queued data packets in mailbox slots waiting to be processed by each processor.

5. The system of claim 1,
wherein the operating system is configured to maintain a task control block for each of the plurality of processors, and the task control block identifies backlogged tasks associated with the plurality of processors; and wherein the load balancing module is configured to interrogate the operating system to determine the backlogged tasks identified by the task control block, and estimate the workloads further based on the backlogged tasks.

6. The system of claim 4, wherein the load balancing module is configured to perform a closed-loop analysis for a subsystem including the plurality of processors, the plurality of port hardware modules, and the plurality of mailboxes, and to distribute the workloads between the plurality of processors based on a result of the closed-loop analysis.

7. The system of claim 6, wherein the load balancing module is configured to reassign additional slots to a processor, of the plurality of processors, in response to a workload for the processor falling below a minimum workload threshold specified for the processor.

8. A method for processing data packets, comprising:
storing data packets in a system memory;
storing descriptors in slots of a mailbox, wherein each of the descriptors identifies a corresponding packet;
fetching, by each of the processors, descriptors from assigned slots in the mailbox;
processing, by each of the processors, data packets in the system memory corresponding to the fetched descriptors in the order in which the fetched descriptors are fetched;
maintaining a packet queue table in memory for each of the processors, wherein each packet queue table identifies data packets waiting to be processed by one of the processors and cross-references the data packets waiting to be processed to corresponding packet types;
determining, based on an interrogation of the packet queue table for each of the processors, a number of data packets waiting to be processed and packet types of the data packets waiting to be processed;
determining each processor's workload based on the number of data packets waiting to be processed and the packet types of the data packets waiting to be processed; and
reassigning slots to processors in response to unequal processor workloads.

9. The method of claim 8, further comprising receiving, by each of the processors, a numbered interrupt vector, associated with a corresponding mailbox; and
wherein the fetching comprises fetching the descriptors from assigned slots in the corresponding mailbox associated with the numbered interrupt vector.

10. The method of claim 9, wherein the determining each processor's workload comprises interrogating the processors to determine the number of queued data packets in slots associated with the processors.

11. The method of claim 10, further comprising:
maintaining a task control block for each of the processors, wherein the task control block identifies backlogged tasks associated with the plurality of processors; and
interrogating the task control block to determine the backlogged tasks,
wherein the determining each processor's workload comprises estimating the workload based on the backlogged tasks.

12. The method of claim 11, wherein the reassigning the slots comprises:
performing a closed-loop analysis for a system including the plurality of processors, port hardware modules that receive the data packets and supply the data packets to a direct memory access engine for storage in the system memory, the operating system, and a plurality of mailboxes; and
distributing the workloads among the plurality of processors based on a result of the closed-loop analysis.

13. The method of claim 12, wherein performing the closed-loop analysis comprises:
establishing a minimum workload threshold for each of the processors; and
assigning additional slots to a processor, of the plurality of processors, in response to a determination that the workload for the processor is less than the minimum workload threshold established for the processor.

14. The method of claim 10, wherein the reassigning the slots comprises:
performing a closed-loop analysis for a system including the plurality of processors, port hardware modules that receive the data packets and supply the data packets to a direct memory access engine for storage in the system memory, and a plurality of mailboxes; and
distributing the workloads among the plurality of processors based on a result of the closed-loop analysis.

15. The system of claim 2, wherein the plurality of port hardware modules comprise at least one Ethernet port module.

16. The system of claim 2, wherein the plurality of port hardware modules write the descriptors to the plurality of slots.

17. The method of claim 8, wherein the storing the descriptors comprises receiving the descriptors from one or more port hardware modules that receive the data packets.

18. The method of claim 17, wherein the receiving the descriptors comprises receiving the descriptors from one or more Ethernet port modules.

* * * * *